United States Patent

Bell

[15] 3,693,727
[45] Sept. 26, 1972

[54] TORQUE CONTROL APPARATUS
[72] Inventor: Leo A. Bell, Villa Maud, Kappara Road, San Gwann, Malta
[22] Filed: Nov. 2, 1970
[21] Appl. No.: 86,108

[52] U.S. Cl. .................................. 173/12, 73/139
[51] Int. Cl. .................................. B25b 23/14
[58] Field of Search ............ 173/12; 73/139; 81/52.5

[56] References Cited
UNITED STATES PATENTS 2,527,456   10/1950   Schmeling .................. 73/139
3,368,396   2/1968   Burkleo et al. .............. 73/139
1,954,176   4/1934   Johnson ...................... 173/12

*Primary Examiner*—Ernest R. Purser
*Attorney*—Pravel, Wilson & Matthews

[57] ABSTRACT

Torque control apparatus for use with pipe tongs in assembling threaded pipe sections, wherein means are provided for sensing and transmitting only the torque producing component of forces applied to the pipe tongs, and means are provided for controlling the amount of such torque applied to the pipe tongs in accordance with a predetermined limit.

7 Claims, 3 Drawing Figures

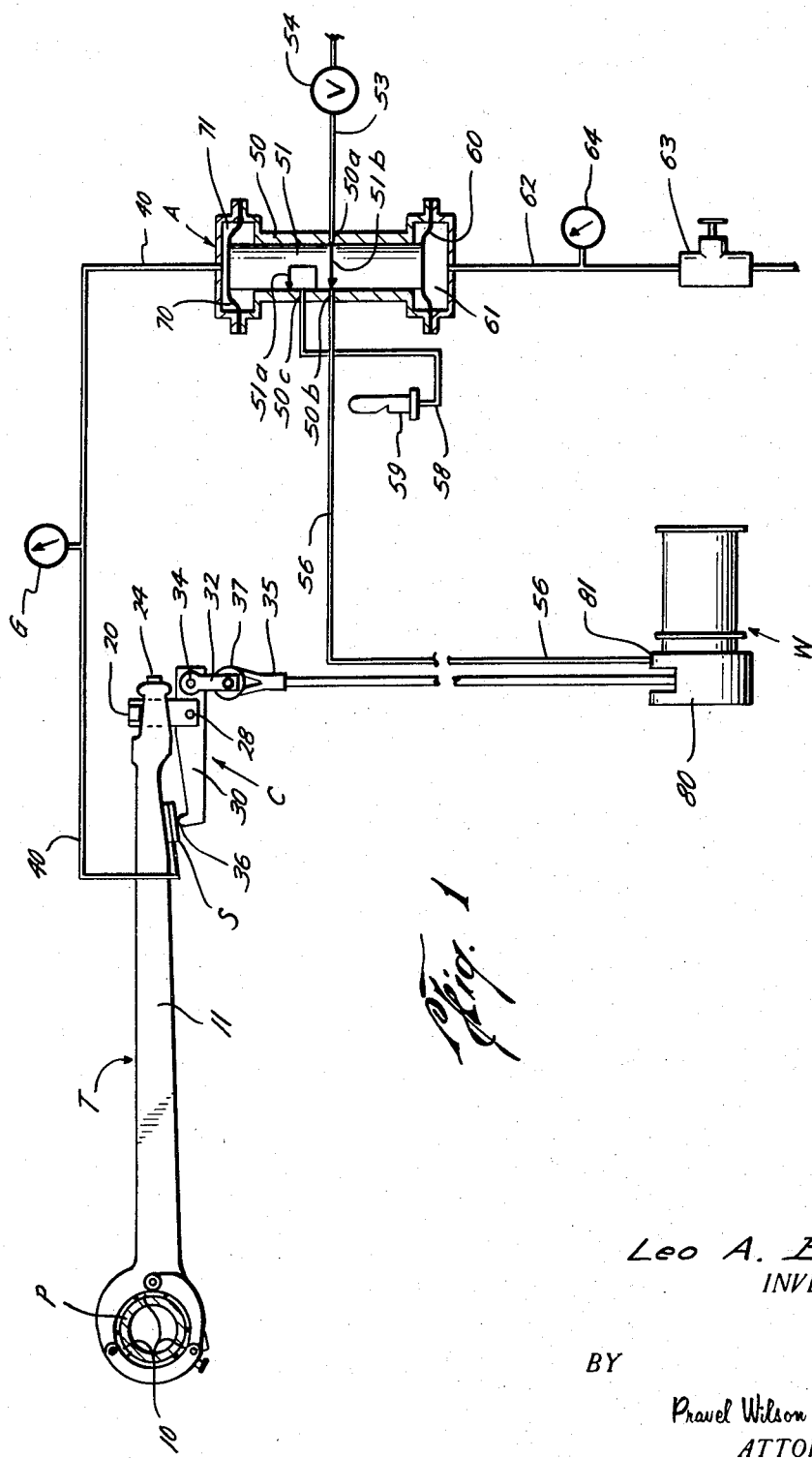

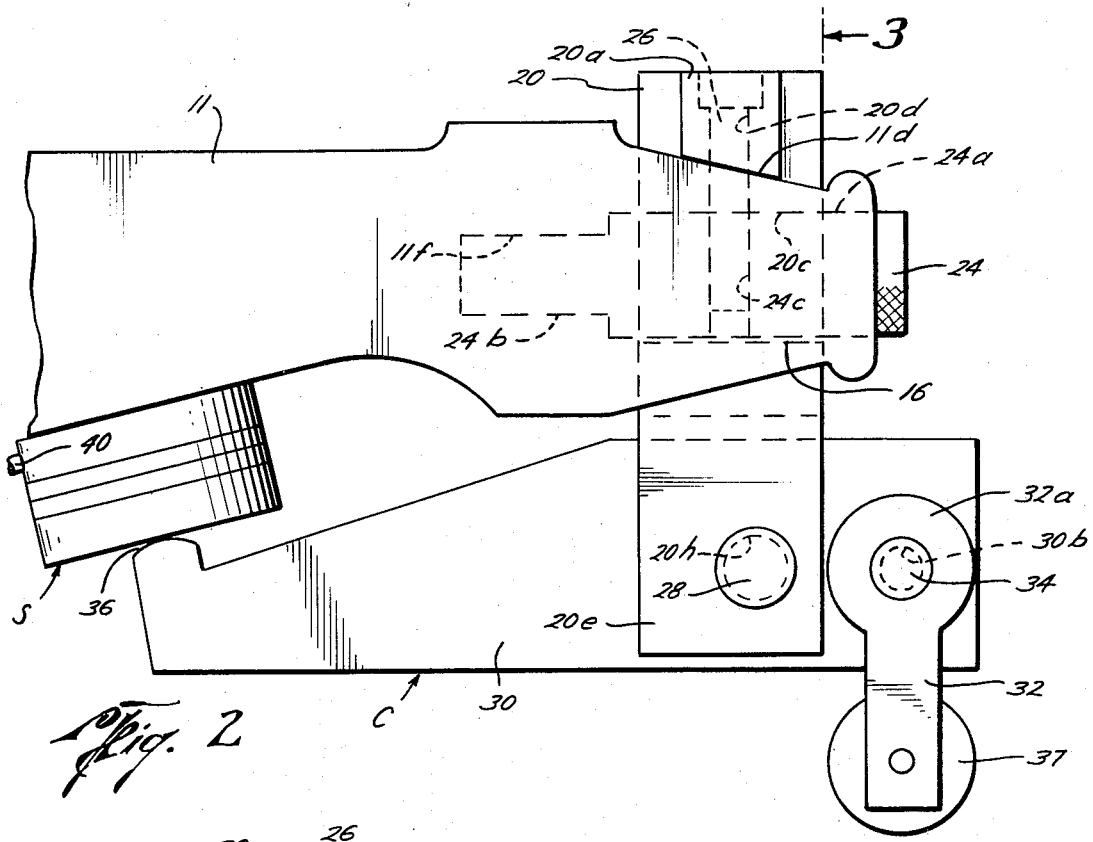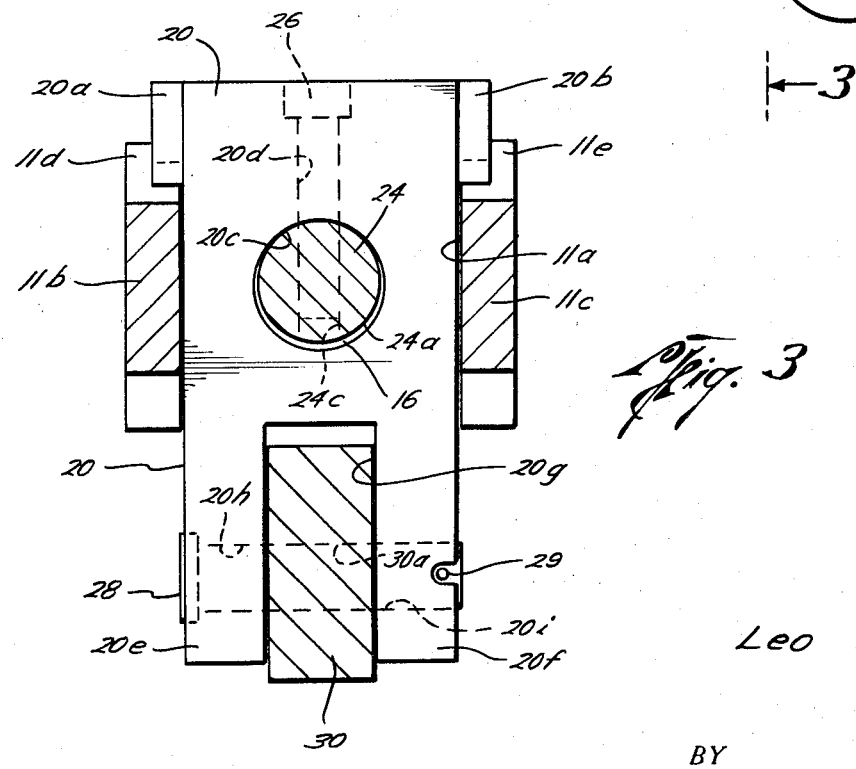

TORQUE CONTROL APPARATUS

BACKGROUND OF THE INVENTION

The field of this invention is apparatus for controlling the assembly of threaded pipe connections.

As is well known, torque or a moment is defined as that which produces or tends to produce rotation and is calculated as the product of a tangential force multiplied by the radius of the part it rotates. Only the part or component of the applied force that acts perpendicularly to the radius or lever arm enters into the determination of torque value. As the application angle of a constant value applied force varies from perpendicular to the lever arm so does the torque value.

In making up threaded joints in a pipe string for insertion into a well, the torque applied to the pipe at the joint is a matter of prime concern. If not adequately tightened, the joint will leak creating a pollution problem and possibly causing a blow out, or work loose causing part of the pipe string to fall in the well, entailing a very expensive and time consuming recovery operation. If a joint is made up too tight, damage to the threads results in ruining the pipe involved and if not detected may result in a failure in the well, perhaps even dropping a portion of the pipe string and again requiring the recovery operation.

A number of prior art devices such as disclosed by U.S. Pat. Nos. 1,080,937; 2,281,226 and 3,368,396 have utilized torque determination in well pipe make-up operations. However, all of such prior art suffers from the disadvantage of indicating total pull on the pipe tongs and not just the torque component, so that they have either been limited to the use of pulling forces perpendicularly disposed to the pipe tongs at all times, or they have not provided true torque readings.

SUMMARY OF THE INVENTION

This invention relates to an apparatus for sensing the true torque applied to an object regardless of the direction of the force applied thereto. More particularly, the apparatus of this invention controls the amount of torque applied to pipe, such as well pipe, in making up threads or performing other operations.

BRIEF DESCRIPTION OF THE DRAWINGS

For a better understanding of the noted objects of the invention, as well as the objects and features not noted, but which objects and features will become apparent from the following detailed description, reference should be made to the accompanying drawings wherein:

FIG. 1 is an overall plan view of the preferred embodiment of the invention;

FIG. 2 is a plan view of a portion of the apparatus of FIG. 1, illustrating in particular the relationship between a sensor device and a force component transmitting means of the apparatus; and FIG. 3 is a sectional view taken on line 3—3 of FIG. 2 to illustrate further details of the invention.

DESCRIPTION OF THE PREFERRED EMBODIMENT

In the drawings, the letter P designates a section of pipe to be rotated to make up a threaded pipe joint, using pipe tongs T, which have pipe jaws 10 of any suitable construction for gripping the pipe P, in a manner well known in the art. The tongs T also have a lever arm 11 extending away from the pipe jaws 10 which serves as the torque determining arm or radius arm. Attached to the lever arm 11 at the end opposite the pipe jaws 10 is the force component transmitting means, designated generally by C and the force component sensing means S. Attached to the force component transmitting means C is a force applying means W which is schematically shown in FIG. 1 and is of conventional construction. The force component sensing means S is connected to an indication means G and an automatic control unit means A which communicates with and controls the force applying means W.

The effective length of the pipe tongs lever arm 11 which serves as the torque determining arm is the distance between the center of the pipe 10 and the point where the force is applied to the pipe tongs lever arm 11 as will be explained in detail hereinafter. This distance may be easily measured and is fixed so that the torque applied to the pipe P varies only with the magnitude of the tangential force or force component perpendicular to the pipe tong lever arm 11.

As can be seen in FIGS. 2 and 3, the force component transmitting means C is pivotally connected to a support body or lever arm support 20, which as will be explained, is attached to the pipe tongs lever arm 11. The lever arm support 20 extends into and through an opening 11a between spaced projections 11b and 11c on the lever arm 11. Two protruding ears 20a and 20b are formed near the upper end of the support 20 which bear against lever arm bearing surfaces 11d and 11e. A removable retainer pin 24 has a larger outer diameter portion 24a which extends through a retainer pin opening 20c in the support 20, and a smaller inner diameter portion 24b which extends into an opening 11f in the lever arm 11. A threaded retainer pin or bolt 26 extends through an opening 20d in lever support 20 as shown and threads into threaded retainer pin opening 24c.

It is to be noted that the diameter of the outer section 24a of the pin 24 is smaller than the diameter of the opening 20c, and also the section 24b fits loosely in the opening 11f, so that when the retainer pin or bolt 26 is tightened sufficiently, the retainer pin 24 is pulled towards the ears 20a and 20b, and as shown in FIG. 3 out of a concentric relationship with the opening 20c, creating a space 16. With such arrangement, the body 20 is supported on the lever arm 11 solely by such ears 20a and 20b and not by the retainer pin 24 which prevents the torque generating forces applied to the pipe tongs T from bending the pin 24 which would make it difficult to remove and insert such pin 24. It should be understood that, although the foregoing connection between the support 20 and the lever arm 11 is preferred, other suitable means for attaching the support 20 to the lever arm 11 may be utilized.

The lower end (FIG. 2) of the support body or lever arm support 20 terminates in a bifurcated portion having legs 20e and 20f with an opening 20g therebetween. A force transmitting lever 30 is pivotally mounted to the support 20 by a pivot pin 28 which passes through aligned openings 20h and 20i in the legs 20e and 20f, respectively, and through an opening 30a in the lever 30. A cotter pin 29 or any other suitable fastening means releasably secures the pin 28 in the lever support body 20.

A clevis 32 or other pulley bracket, having a bifurcated portion 32a with a leg on each side of the lever 30 is pivotally connected to the lever 30 by a suitable pivot pin 34 extending through another opening 30b in the lever 30. A pulley 37 is rotatably mounted on the clevis or bracket 32 and to which is attached a cable 35, commonly known as a tug line, jerk line or back-up line, the other end of which is operably engaged with the force applying means W as will be described later.

The lever 30 is free to pivot around the pivot pin 28 whenever force is applied to the cable 35 until a lever 30 contact portion 36 contacts the force component sensing means S. The lever ratio of distance between the sensor contact point on the contact portion 36 and the pivot point at pivot pin 28 to the distance between the pivot point at pin 28 and the clevis pin 34 influences the magnitude of the torque generating force applied to the sensor S with a predetermined force on the cable 35. Such ratio may be varied, as will be understood by those skilled in the art, but a four-to-one ratio is preferred as this permits the sensor output graduations or steps to be smaller and more precise while the lever 30 remains a convenient length.

The force component sensing means S, securely attached to the pipe tongs, is a hydraulic diaphragm weighing device well known as a load cell system, an example of which is described in the "Composite Catalog of Oil Field Equipment and Services" 27th Rev. (1966), page 3264. The load cell output is a hydraulic signal proportional in response to the strain placed upon the cell. The sensor means or load cell S is connected by tubing 40 (FIG. 1) to the gauge or indicating means G and to the automatic control unit means A in a manner to be described hereinafter. The indicating means G is preferably a standard pressure gauge calibrated to indicate the output of the cell or sensor means S in pounds of force or, since the length of the lever 30 is known, directly in foot-pounds of torque. It will be appreciated that the hydraulic output of the load cell S may be indicated in other ways than the gauge G. For example, a continuous type hydraulic pressure recorder may be connected to the tubing 40 from the sensor means S. Also, if desired, by the use of a hydraulic-electric transducer instead of the gauge G, the output of the cell S can be changed from hydraulic to electrical. These and many other equivalent variations will be readily apparent to one skilled in the art.

In FIG. 1, the letter A refers generally to the automatic control unit, or comparing unit, having diaphragm operators of the opposite ends of a sleeve 50. An actuating control valve means 51 is slidably disposed within the sleeve 50 and it is connected to diaphragms 60 and 70 for movement therewith. The sleeve 50 has an actuating fluid port 50a which is connected by tubing 53 through a control valve 54 to a source of actuating fluid under pressure (not shown). Either hydraulic or pneumatic actuating fluid may be used, but the pneumatic system is preferred. The sleeve 50 has a clutch actuating port 50b which is connected through tubing 56 to a clutch 81, in a manner to be described hereinafter. A whistle or other fluid actuated signal device 59 is connected by tubing 58 to a port 50c in the sleeve 50.

The slide 51 serves as a valve means which has two passages 51a and 51b. The passages 51b, as schematically shown in FIG. 1, connects the actuating fluid port 50a and clutch actuating port 50b when the slide valve 51 is in the raised or reference position, a feature to be described below. The passage 51a, when slide valve 51 is in the lowered or operated position, connects the clutch actuating port 50b through the passage 51a with the whistle port 50c.

The reference diaphragm 60 is attached to slide 51 in a suitable manner known in the art, and is responsive to a predetermined fluid pressure in the reference diaphragm chamber 61 which is connected through tubing 62 to a source of fluid under pressure (not shown). Either a pneumatic or hydraulic system may be used to establish a reference pressure in the chamber 61. The preferred and illustrated embodiment, however, is pneumatic. An adjustable pressure regulator 63 is installed in the supply tubing 62 to set and maintain the desired predetermined fluid pressure in the reference diaphragm chamber 61, A pressure qauqe 64 indicates that the set reference pressure is being exerted on the diaphragm 60. The gauge is calibrated in foot-pounds of torque necessary to overcome the reference pressure in a manner to be described hereinafter.

The sensor diaphragm 70, shown in FIG. 1 in the raised or reference position, is also attached to the slide valve 51, but is responsive to the fluid pressure of the sensor means S which is transmitted to the sensor diaphragm chamber 71 through the sensor output tubing 40. With such arrangement, the slide valve 51 is forced in a 74 away from the greater of the fluid forces acting in the chambers 61 and 71. Because the illustrated diaphragms 60 and 70 have the same area exposed to the fluid pressure in the chambers 61 and 71, only the pressures in the chambers 61 and 71 influence the operation of the unit, but diaphragms of different exposed areas or other equivalent comparing devices may be used instead of the equal area diaphragms.

The force applying means W is attached through the cable 35 to the lever 30 by the clevis 32 and such means W includes a winch-like power unit 80 commonly referred to as the cathead. The operation of the cathead is controlled by the air operated clutch 81 which is of a conventional type that disengages upon a predetermined reduction in air pressure supplied thereto through the tubing 56 from the port 50b of the automatic control unit as previously explained. A hydraulic or electrical actuated clutch may be used instead of the air operated clutch, with suitable controls.

In the use or operation of the invention, the operator first sets the pressure regulator 63 (FIG. 1) to a pressure in the reference diaphragm chamber 61 which will give the proper torque value such as that specified by the American Petroleum Institute for the size and type of pipe joint to be made up as indicated on the pressure gauge 64. This holds the actuating control slide valve 51 in the position illustrated in FIG. 1 which aligns passage 51b with ports 50a and 50b, allowing actuating air pressure from the tubing 53 to pass through the slide valve 51 and tubing 56 to the air operated clutch 81 on the winch 80. Thereafter, the pipe P may be rotated or turned a partial revolution by pulling the pipe tongs 11 with cable 35 through operation of the valve 54 which controls the supply of air to the clutch 81. When actuating air pressure is supplied to the clutch 81 the winch 80 is engaged, pulling on the pipe tongs 11. This rotates the pipe P through an arc until the operation is stopped by closing the valve 54 to disengage the clutch 81 stopping pull on the cable 35. The pipe jaws 10 are than disengaged from the pipe P and the lever arm 11 returned to the original position where the jaws 10 again grip the pipe P. Air pressure is then again applied to the clutch 81 by operation of the valve 54. This operation is sequentially repeated until the pipe is brought to the desired tightness.

As can be seen most clearly in FIG. 2, when the force applying means W exerts a pull on the clevis 32, the lever arm 30 is rotated about the pivot pin 28 until the rounded contact portion 36 comes into contact with the load cell S. At this point, the lever arm 30, lever arm support 20, stress sensor S and pipe tongs T are placed in equilibrium and the laws of static engineering mechanics apply to the system. The force applying means W thus creates a moment and a force on the lever 30. The perpendicular nature of the contact between the lever contact portion 36 and the stress sensor S is so that only the induced moment in the lever 30 is resisted by the sensor S and all non-moment producing component forces are resisted by pivot pin 28. Since the pipe tongs T and sensor means S are in equilibrium, the torque or moment producing force exerted on the sensor means S must also be resisted by the pipe tongs T which is pivoted concentrically with the pipe jaws 10 and the pipe P to be tightened. Therefore, torque induced in the pipe tongs T is transmitted to the pipe P causing the pipe P and the equilibrium system to rotate until the threaded pipe joint is made up to a tightness that the resisting torque of the joint is substantially equal to the induced torque.

Thus, since the torque or moment applied to the pipe P is the same moment resisted by the force induced in the load cell S, it becomes clear that this apparatus only senses the true torque valve regardless of the direction of the force applied to the lever 30 through the cable 35. By the use of the pivoted lever 30, components of the forces applied thereto through the cable 35 which are not perpendicular to the lever 30 and not producing torque are not exposed to the sensing means S so that the direction of such forces does not affect the sensed torque at the sensor S.

The true torque force imposed on the load cell S generates a hydraulic pressure output through the tubing 40 to the gauge or other indicating or recording means G where the operator can observe the progress of the pipe make-up operations and to the sensing diaphragm chamber 71 of the automatic control unit A.

When the pressure of the sensor output in the upper diaphragm chamber 71 is greater than the pressure set by the operation in the reference diaphragm chamber 61, the slide valve 51 is forced downwardly or towards the reference diaphragm chamber 71. This first moves the passage 51b out of registry with the actuating fluid port 50a and clutch actuating port 50b so that the slide valve 51 blocks the supply of actuating fluid to the clutch 81 of the force applying means W. As the slide valve 51 moves downwardly, it reaches a second position where the passage 51a is brought into registry with the clutch actuating port 50b and the whistle port 50c, which allows the air under pressure in the clutch 81 and actuating tubing 56 to escape to the atmosphere through the whistle 59, thus serving two functions. First, the loss of actuating pressure to the winch clutch 81 causes it to disengage, stopping the pipe tightening operation at the desired torque valve, and secondly, the escaping air actuates the whistle or other signal device, alerting the operator that the joint is made up to the proper torque, and that the valve 54 should be closed to terminate the operation.

The tightening operation may be controlled without the aid of the automatic control means. By visually observing the torque value displayed on the indicating means G, the operator may through manipulation of the valve 54 manually complete the operation at the desired torque value by closing the valve 54.

The foregoing disclosure and description of the invention are illustrative and explanatory thereof, and various changes in the size, shape and materials as well as in the details of the illustrated construction may be made within the scope of the appended claims without departing from the spirit of the invention.

I claim:

1. Apparatus for sensing and controlling true torque applied to pipe in making up threaded pipe joints, comprising:

a pipe tong for engaging pipe to make up a threaded pipe joint, a stress sensor means mounted on said pipe tong;

a force component transmitting means mounted on said pipe tong and contacting said sensor means for transmitting a torque producing component of a force applied to said transmitting means;

force applying means connected to said transmitting means for applying turning movements to said pipe tong to make up a threaded pipe joint; and control means connected and operable in response to the amount of the torque producing component applied to said sensor means by said transmitting means for discontinuing the force applied to said transmitting means by said force applying means when the torque applied to the pipe by said pipe tong reaches a predetermined amount.

2. The apparatus set forth in claim 1, including means for connecting said force applying means to said transmitting means for applying forces in various directions.

3. The apparatus set forth in claim 1, wherein said force component transmitting means includes:

a pivoted lever mounted on said power tong and having one end contacting said sensor means and the other end connected to said force applying means; and means pivotally connecting said lever to said pipe tong.

4. The apparatus set forth in claim 1, wherein said control means includes:

a control diaphragm having one side thereof in communication with fluid from said sensor means and subject to fluctuations in response to variations in torque forces applied to said sensor means by said force component transmitting means;

means for applying a predetermined fluid pressure to the other side of said diaphragm opposite from said one side;

valve means operably connected to said control diaphragm and movable therewith; and an actuating means connected from said valve means to said force applying means operable to discontinue the application of force by said force applying means when the fluid pressure acting on said one side of said diaphragm is substantially equal to said predetermined fluid pressure acting on the other side thereof.

5. The apparatus set forth in claim 1, including:

means connected to said sensor means for indicating the torque component of the force generated by the force applying means.

6. The apparatus set forth in claim 1, wherein said control means includes:

a control member in communication with said sensor means and subject to fluctuations in response to variations in torque force applied to said sensor means by said force component transmitting means;

biasing means applying a predetermined force opposing the torque responsive control member;

actuating means operably connected to said control member and responsive therewith;

connecting means for connecting said actuating means to the force applying means and operable to discontinue the application of force by said force applying means when the force acting on said control member from said sensor means is substantially equal to said predetermined opposed biasing means.

7. The apparatus set forth in claim 6, wherein:

said control member includes a control diaphragm having one side in communication with said sensor means; and said sensor means output comprises fluid pressure.

* * * * *